A. G. TISDEL.
Magnet-Telephone.

No. 227,861.  Patented May 18, 1880.

WITNESSES:
Henry N. Miller
C. Sedgwick

INVENTOR:
A. G. Tisdel
BY Munn & Co
ATTORNEYS.

UNITED STATES PATENT OFFICE.

ABNER G. TISDEL, OF ILION, ASSIGNOR TO FRANK A. KLEMM AND ERNEST MARX, OF NEW YORK, N. Y., SIMON WOLF, OF WASHINGTON, D. C., AND MORITZ LOTH, OF CINCINNATI, OHIO.

MAGNET-TELEPHONE.

SPECIFICATION forming part of Letters Patent No. 227,861, dated May 18, 1880.

Application filed November 14, 1879.

*To all whom it may concern:*

Be it known that I, ABNER G. TISDEL, of Ilion, in the county of Herkimer and State of New York, have invented a new and useful Improvement in Speaking-Telephones, of which the following is a specification.

My improvements relate to the class of telephones using a permanent magnet and induction-coil, whereby the magnetic vibrations of the poles caused by the induced current and vibrations in magnetic force produce the sound-waves by action upon a diaphragm, or, reversely, the variations in magnetic force and vibration of the magnet are produced by the sound-waves acting on the diaphragm.

My invention consists in the combination and construction of parts, as hereinafter described and claimed, whereby freedom of vibration of the diaphragm of a telephonic transmitter and receiver is controlled so that the effect of the force of the magnetic current may be easily regulated at will.

Figure 1:
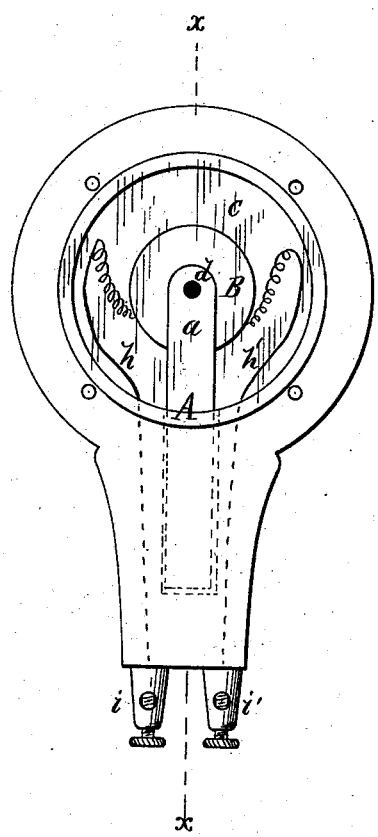
Figure 2:
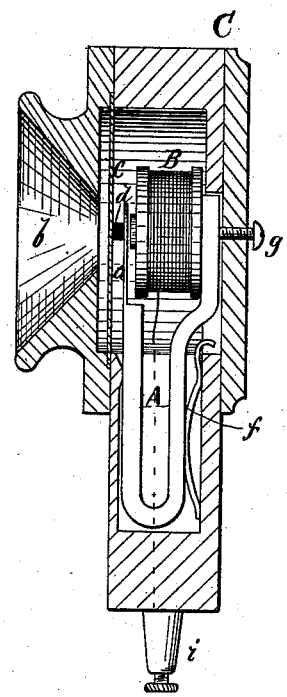

Figure 1 is a front elevation of the instrument, the mouth-piece being removed. Fig. 2 is a cross-section on the line $x\,x$ of Fig. 1.

Similar letters of reference indicate corresponding parts.

A is a permanent magnet of U form, having one pole surrounded by the induction-coil B, and its other pole terminating in a thin metallic tongue, $a$. The coil B is upon a right-angled extension of the pole which projects contiguous to the tongue $a$, so that both poles of the magnet are within the magnetic field. These parts are fitted in a case, C, having a mouth-piece, $b$, beneath which is clamped the diaphragm $c$, of mica or other non-conducting material.

Upon the tongue $a$ is a small block or point, $d$, of metal, rubber, or other material, which is in mechanical contact with diaphragm $c$.

The magnet A extends into a recess of the case B, in which is a spring, $f$, that tends to press the other end of the magnet away from the diaphragm $c$, and in the back of the case a screw, $g$, is fitted, bearing upon the magnet against the pressure of spring $f$, so that by turning screw $g$ the pressure of the block $d$ upon the diaphragm may be regulated.

The connecting-wires $h\,h'$ from coil B connect with the binding-posts $i\,i'$, respectively, for connection with the circuit that is to contain a similar instrument.

The instrument in the form shown is adapted for transmitting or receiving.

In operation as a transmitter the vibrations of the diaphragm will cause the vibration of the tongue $a$ to and from the other pole of the magnet. Such vibrations being entirely within the magnetic field, the magnetic force and induced current will vary with the extent of vibration. These variations in the induced current act in the receiving-instrument to vary the magnetic force of the induction-coil, and the tongue $b$ and diaphragm $c$ of the receiver will be vibrated in harmony with the transmitter to produce articulate sounds.

I am aware that in telephones a permanent magnet has been used with one pole fitted with a helix and the other pole formed as a vibrating diaphragm. In such instruments, to obtain the required amplitude of vibration, the magnet-bar must be shortened to admit a diaphragm of the size required, while in my instrument the vibrating tongue may be short and the poles of the magnet brought closely together. The tongue, being also protected, may be of the most delicate construction.

Having thus described my invention, I claim as new and desire to secure by Letters Patent—

In speaking-telephones, the spring $f$ and adjusting-screw $g$, combined with the magnet A, diaphragm $c$, block $d$, and case C, substantially as and for the purposes set forth.

ABNER G. TISDEL.

Witnesses:
GEO. D. WALKER,
C. SEDGWICK.